Jan. 15, 1957 F. H. DINEEN ET AL 2,777,760
VINYL ACETATE REACTOR
Filed Oct. 31, 1952
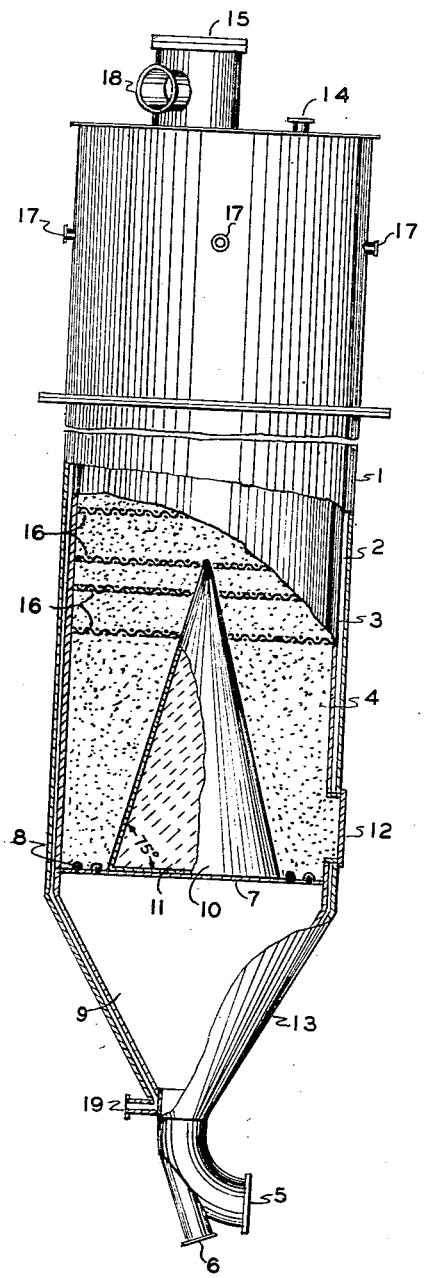
INVENTORS
FRANCIS HENRY DINEEN
SAMUEL ARNOLD McNEIGHT
WILLIAM HENRY VINING
BY *Theodore ?. Burrow*
ATTORNEY

2,777,760
VINYL ACETATE REACTOR

Francis H. Dineen, Niagara Falls, N. Y., Samuel A. McNeight, Richland, Wash., and William H. Vining, Niagara Falls, N. Y., assignors to E. I. du Pont de Nemours & Company, Wilmington, Del., a corporation of Delaware Application October 31, 1952, Serial No. 318,064

10 Claims. (Cl. 23—288)

This invention relates to improvements in vapor phase organic reactions involving the use of a fluidized solids catalyst especially where substantial thermal effects are a concomitant.

Apparatus and process methods have become highly developed in recent years in the art of conducting catalytic vapor phase reactions wherein the flow of reaction gases into and through the catalyzing zone effects fluidization of the catalyst which must be in granular or particulate form, not too fine a powder and yet not too coarse so that the catalyst will not be blown out of the reactor on the one hand nor become a substantially stationary bed catalyst mass on the other. As reaction chambers for fluidized solids contact become larger and larger for reasons of economy and need for high rates of production, difficulties are encountered in maintaining relatively uniform catalyst particle dispersion in the gaseous reaction zone. One manifestation of this faulty dispersion is often referred to as "slugging." This is an irregular succession of huge gas bubbles separated by relatively dense catalyst masses which usually originate near the area of entry of reaction gases into the reaction vessel. Another difficulty is the localized accumulation of agglomerated, hardened catalyst masses because of the formation of relatively non-volatile decomposition products, such as carbon, which result from local over-heating due to inadequate reaction heat dispersal which is also related to poor catalyst fluidization since it is the uniform "boiling" or fluidization of the catalyst mass which permits maintenance of uniform temperature throughout the reactor.

It is an object of this invention to provide apparatus and process for improved fluidization of particulate or granular solids catalyst fluidized by reaction gases undergoing exothermic reactions. Another object is to provide for more uniform dispersion of solid catalyst particles in a fluidization vapor phase reactor. A further object is to provide an improvement in the reaction of acetylene and acetic acid for the production of vinyl acetate in a fluid-solids reactor. Other objects will be apparent from the further discussion of this invention.

Our invention involves passing reaction gases at a suitable predetermined temperature into the bottom of a vertical reaction chamber partly filled with granular solid catalyst at such a rate that the granules become fluidized. Immediately above the reaction gas inlet but in the lower end of the elongated cylindrical reaction chamber, there is provided a horizontally disposed distribution device or plate. This plate serves to support the catalyst whenever there is no gas flow and it provides a multiplicity of gas ducts so restricted in over-all gas flow capacity as to provide a degree of pressure drop or pressure differential. These gas ducts may be, for example, a variety of the well-known distilling column bubble caps. In addition to the gas ducts, the plate may support the base of a cone which latter has a height of one-fifth to three-fifths of the interior height of the catalyst chamber. The base of the cone covers an area at least one-fourth that of the distributor plate and may cover up to three-fourths. In the preferred construction, the reaction chamber is a vertical cylinder and the cone is coaxial therewith. The gas ducts or bubble caps may be disposed relatively evenly in the circular distributor plate area formed by the annular region between the wall of the reactor and the base of the cone. The cone must be so constructed that the volume occupied by it is substantially free from reaction gases and so that no reaction will take place within it. The cone may, if desired, be used for purposes of heat control of the reaction zone.

In large reaction chambers, that is reactors over two feet in diameter, it is generally necessary to provide baffles which will help to break up condensed catalyst masses or slugs so as to obtain more uniform catalyst distribution throughout the reaction zone. Such baffles are usually made of screens with mesh of suitable cross sections so as to permit easy passage of catalyst particles while tending to break up overly condensed masses. The number of such baffles is dictated by the size of the reactor and by the character of the catalyst being fluidized as well as the required rate of travel of reaction gases and degree of temperature control needed.

Having outlined the general aspects of the invention, a specific application of the principles involved is outlined in greater detail in the following discussion of the drawing, which shows one modification of the invention, as related to the reaction of acetylene and acetic acid in the manufacture of vinyl acetate.

The drawing is an elevation with parts broken away and in section of a reaction vessel adapted to carry on fluidized solids catalyzed reactions and shows schematically the principles of the present invention.

The reactor shell 3 contains the reaction zone 4. This shell is surrounded by a jacket-like annular space 2 defined by the outer shell 1 and 3. A heat control liquid, such as oil can be circulated through this space through openings 17 at the top and 19 at the bottom.

Reaction gas is fed into the reactor at 5 and 6. The inverted cone shaped space 9 at the bottom of the reaction zone 4 may serve as a premixing area for the reaction gases. The gases pass into the catalyst zone through means 8 which may be a type of bubble cap and serve to distribute the gas into the catalyst area. The bubble caps 8 are supported on plate 7 which can be called a distributor plate. Also supported on the distributor plate 7 is the base of cone 10 which covers the central area of the plate. The cone 10 is preferably filled with carbon 11 so as to prevent any dangerous accumulation of explosive gases. If desired the cone can be hollow but care must be taken to make it gas tight. In that case a breather pipe not shown, may be advisable to prevent development of excessive pressures due to temperature variations. The base of the cone will cover between about one-fourth to three-fourths of the cross-sectional area of the distributor plate. The angle between the cone side and base is preferably about 75° but may vary between 50° and 80°, depending upon the physical nature of the catalyst used. The height of the cone from base to apex will be from one-fifth to three-fifths the internal vertical height of the reactor.

Catalyst can be fed to or withdrawn from the reactor at ports 14 and 12. Reaction products are withdrawn at 18 and will pass into a recovery train not shown. Conventional screens of desired number are shown at 16. The screens will be of a mesh suitable for freely passing catalyst particles of the size used.

By way of a specific example the apparatus as described was charged through manhole 15 with a catalyst up to about one-fourth of the reaction space capacity. The catalyst had a range of particle size between 30 to 150 mesh and consisted of activated charcoal from coconut shells impregnated with zinc acetate. Catalyst containing around 7 to 10% zinc as acetate is suitable. Acetylene and acetic acid vapors were fed into the reactor at 5 and 6 respectively in ratios between 3 to 1 to 5 to 1. The raw material gases were preheated by passage through suitable heat interchangers. Gas pressures were such as to fluidize the catalyst and to provide a pressure drop of about one pound per square inch through the bubble caps 8. Oil was circulated through the oil jacket or annular space 2 at such temperatures as to maintain a reaction zone 4 temperature between 170 and 230° C. The reacted gas issued from port 18 and was treated in a train not shown to separate entrained catalyst particles and to recover vinyl acetate from unreacted acetylene and acetic acid. After separation and purification the acetic acid and acetylene were again passed into the reactor together with sufficient make-up raw materials to maintain the process in continuous operation.

Operating in this fashion for several days continuously a 50% conversion of acetic acid to vinyl acetate was realized at a catalyst consumption of about one pound for 23 pounds of vinyl acetate. In contrast to this successful run a run was made in the same reactor except that the cone 11 was replaced by numerous additional bubble caps 8 so as to secure uniform reaction gas distribution above the distributor plate 7. Several days of operation without the cone resulted in an average conversion of 18% acetic acid to vinyl acetate and a consumption of one pound of catalyst for every 3.9 pounds of vinyl acetate. But in addition to this low raw materials conversion and catalyst yield there was much trouble because of packing of catalyst, slugging and excessive carbon and undesirable by-product tar formation. These difficulties were attributable to poor temperature control and consequent local hot spots.

To obtain good contact and high degree of temperature control in conducting a fluidized solids catalyst reaction on a large scale, a suitable pressure differential is necessary at the point where the reaction gases enter into the reaction zone. Such a differential may vary between about one inch of water and up to several pounds per square inch depending upon various factors such as weight and particle size of catalyst. A pressure drop or pressure differential of between 1 pound and 10 pounds per square inch is a suitable range. This pressure differential may be established by the use of bubble cap type of gas inlet or distributors of small cross section. In one case it was found that by using openings of about ½ inch diameter the total area of openings in the annular area around the cone amounted to about 0.4% of the total of said annular area, and produced a pressure drop of about 1½ pounds per square inch. However, we do not limit ourselves to these proportions, nor to bubble caps, since any conventional devices for holding the catalyst during shut down and yet providing for the desired pressure drop and suitable fluidization of the catalyst by the reaction gases during operation may be used.

The cone in our reactor may rest on the distributor plate as a matter of convenience. The cone could also be supported in any other desired manner and it should preferably be gas impervious and its base surrounded by an annular area or annular distributing plate which serves to support the catalyst when gas is not passing into the reactor. The cone restricts the cross sectional area of the reaction zone at the bottom of the reactor and thus provides for better fluidization of the catalyst and helps to prevent localized catalyst build up, accompanied by local over heating and excessive formation of undesirable tars, coke and other useless by-products.

The shape of the cone may be varied. Thus it may be a polygonal sided cone shaped structure, such as a pyramid. Also, the sides of the cone may be parabolic or the cone may be in the shape of a rounded dome of any suitable angle or slope. A cone whose sides form an angle of 75° with the base is our preferred construction. However, the cone angle may vary between about 60° and 80°, depending upon the special requirements determined by catalyst particle size, weight and shape and internal height of reactor. In general, the cone angle will preferably be slightly greater than the angle of repose of the catalyst when it is allowed to build up in a self supporting pile as high as possible. To achieve good fluidization of catalyst it is preferable to have the cone concentrically arranged in a cylindrical reactor.

By elongated cylindrical reaction chamber we mean that the height or length of the reaction chamber will be greater than its diameter. The sides of the reaction chamber may be polygonal, but this would have no material advantage over the cylindrical form.

We have illustrated the use of our invention as applied to the production of vinyl acetate. However, our apparatus can be used to carry on other reactions requiring contact of reaction gases with fluidized solids catalysts. The apparatus is suitable for pyrolytic reactions generally, such as cracking petroleum hydrocarbons. Reactions involving molecular rearrangements, such as are involved in making high octane gasoline are also suitably conducted in our apparatus.

We claim:
1. Apparatus for vapor phase reaction by contact of reaction gases with a fluidized solids catalyst comprising: a vertical elongated reaction chamber having a substantially uniform horizontal cross section for containing the fluidized catalyst; a horizontally disposed distributor plate in the lower portion of said chamber; means for introducing reaction gases to the lower end of the reaction chamber below said horizontally disposed distributor plate for distributing the reaction gases into the catalyst bed to effect fluidization of the catalyst, a gas impervious cone with its base occupying the center area of said plate, the base of said cone having an area of about one-fourth to three-fourths of the area of said distributor plate, said cone having a height from base to apex of about one-fifth to three-fifths of the internal vertical height of said reaction chamber; means for introducing reaction gases through a plurality of openings in the annular area of said distributor plate delimited by the base of said cone and by the interior wall of the reaction chamber; and means for removing reacted gases from the upper end of the reaction chamber.

2. Apparatus for vapor phase reaction by contact of reaction gases with a fluidized solids catalyst comprising: a vertical elongated reaction chamber having a substantially uniform horizontal cross section for containing the fluidized catalyst; a horizontally disposed distributor plate in the lower portion of said chamber; means for introducing reaction gases to the lower end of the reaction chamber below said horizontally disposed distributor plate for distributing the reaction gases into the catalyst bed to effect fluidization of the catalyst, a gas impervious cone with its base occupying the center area of said plate, the base of said cone having an area of about one-fourth to three-fourths of the cross sectional area of the reaction chamber, said cone having an angle between about 60° and 80° between its side and base, said cone having a vertical height of less than three-fifths of the vertical height of said reaction chamber, means for introducing reaction gases through a plurality of openings in the annular area of said distributor plate delimited by the base of said cone and by the interior wall of the reaction chamber; and means for removing reacted gases from the upper end of the reaction chamber.

3. Apparatus for vapor phase reaction by contact of reaction gases with a fluidized solids catalyst comprising: a vertical elongated reaction chamber having a substantially uniform horizontal cross section for containing the fluidized catalyst; a horizontally disposed distributor plate in the lower portion of said chamber; means for introducing reaction gases to the lower end of the reaction chamber below said horizontally disposed distributor plate for distributing the reaction gases into the catalyst bed to effect fluidization of the catalyst, a gas impervious cone with its base occupying the center area of said plate, the base of said cone having an area of about one-fourth to three-fourths of the cross sectional area of the reaction chamber, said cone having an angle of about 75° between its side and base, said cone having a vertical height of less than three-fifths of the vertical height of said reaction chamber, means for introducing reaction gases through a plurality of openings in the annular area of said distributor plate delimited by the base of said cone and by the interior wall of the reaction chamber; and means for removing reacted gases from the upper end of the reaction chamber.

4. Apparatus for reacting acetylene and acetic acid in the vapor phase by contact with a fluidized solids catalyst comprising: a vertical elongated reaction chamber having a substantially uniform horizontal cross section for containing the fluidized catalyst; a horizontally disposed distributor plate in the lower portion of said chamber; means for introducing reaction gases to the lower end of the reaction chamber below said horizontally disposed distributor plate for distributing the reaction gases into the catalyst bed to effect fluidization of the catalyst, a gas impervious cone with its base occupying the center area of said plate, the base of said cone having an area of about one-fourth to three-fourths of the cross sectional area of the reaction chamber, said cone having an angle of about 75° between its side and base, said cone having a vertical height of less than three-fifths of the vertical height of said reaction chamber, means for introducting reaction gases through a plurality of openings in the annular area of said distributor plate delimited by the base of said cone and by the interior wall of the reaction chamber; baffle means horizontally disposed in the reaction zone of said chamber; and means for removing reacted gases from the upper end of the reaction chamber; and means for controlling the temperature in said reaction chamber.

5. In an apparatus for vapor phase reaction by contact of vaporized reaction gas with a fluidized solids catalyst, in combination, a vertical elongated reaction chamber having a substantially uniform horizontal cross section for containing the fluidized catalyst, a horizontally disposed cross-sectional device in the lower portion of said chamber, means for introducing the reaction gas below said horizontal cross-sectional device comprising an annular device adapted to distribute said gas into said catalyst through a multiplicity of ducts of such size and number as to provide a gas pressure differential between about 1 and 10 pounds per square inch and a gas impervious cone whose base is enclosed by said annular device, and whose apex extends concentrically into the reaction zone to a distance not substantially greater than three-fifths of the vertical height of said reaction chamber, the base of said cone having an area of about one-fourth to three-fourths of the cross sectional area of the reaction chamber, said cone having an angle between about 60° and 80° between its side and base, and means for removing reaction gas from the upper end of the reaction chamber.

6. In apparatus for vapor phase reaction by contact of vaporized reaction gas with a fluidized solids catalyst, in combination, a vertical elongated reaction chamber having a substantially uniform horizontal cross section for containing the fluidized catalyst, a horizontally disposed cross-sectional device in the lower portion of said chamber, means for introducing the reaction gas below said horizontal cross-sectional device comprising an annular device adapted to distribute said gas into said catalyst through a multiplicity of ducts of such size and number as to provide a gas pressure differential between about 1 and 10 pounds per square inch and a gas impervious cone whose base is enclosed by said annular device, and whose apex extends concentrically into the reaction zone to a distance not substantially greater than three-fifths of the vertical height of said reaction chamber, the base of said cone having an area of about one-fourth to three-fourths of the cross sectional area of the reaction chamber, said cone having an angle between about 60° and 80° between its side and base, baffle means horizontally disposed in the reaction zone of said chamber; and means for removing reaction gas from the upper end of the reaction chamber.

7. Apparatus for fluidizing particulate solids comprising a vertical, elongated cylindrical chamber for containing the fluidized solids, a gas-impervious cone located coaxially in the lower part of said chamber and means for flowing fluidizing gases upwardly through the annular space between the base of said cone and the side walls of said chamber, said cone having a base area equal to between about one-fourth and three-fourths of the cross-sectional area of said chamber and the conical surface of said cone having an angle greater than the angle of repose of said particulate solids, the apex of said cone extending to a vertical height not exceeding three-fifths of the vertical height of said reaction chamber.

8. Apparatus for fluidizing particulate solids comprising a vertical, elongated cylindrical chamber for containing the fluidized solids, a gas-impervious cone located coaxially in the lower part of said chamber, an annular gas distributing plate extending horizontally from the base of said cone to the side wall of said chamber and means for passing fluidizing gas upwardly through a plurality of openings in said distributing plate, said cone having a base area equal to between about one-fourth and three-fourths of the cross-sectional area of said chamber and the conical surface of said cone having an angle greater than the angle of repose of said particulate solids, the apex of said cone extending to a vertical height not exceeding three-fifths of the vertical height of said reaction chamber.

9. Apparatus for reacting gases by contact with a fluidized solids catalyst comprising an elongated cylindrical reaction chamber, a catalyst support device near the bottom of said chamber, gas ducts in said support device and a gas-impervious cone with its base disposed near the bottom of said chamber, the apex of said cone extending coaxially into the reaction zone of said chamber, said cone having a base area equal to between about one-fourth and three-fourths of the cross-sectional area of said chamber and the conical surface of said cone having an angle greater than the angle of repose of said catalyst, the apex of said cone extending to a vertical height not exceeding three-fifths of the vertical height of said reaction chamber.

10. Apparatus for reacting gases by passage through a fluidized solids catalyst comprising an elongated cylindrical reaction chamber, a catalyst support device near the bottom of said chamber, gas ducts in said support device to admit the reaction gases into said catalyst, a gas-impervious cone with its base disposed near the bottom of said chamber, the apex of said cone extending coaxially into the reaction zone of said chamber, and baffles horizontally disposed in said reaction zone, said cone having a base area equal to between about one-fourth and three-fourths of the cross-sectional area of said chamber and the conical surface of said cone having an angle greater than the angle of repose of said catalyst, the apex of said cone extending to a vertical height not exceeding three-fifths of the vertical height of said reaction chamber.

References Cited in the file of this patent

UNITED STATES PATENTS

| | | |
|---|---|---|
| 2,485,044 | Gehrke | Oct. 18, 1949 |
| 2,536,307 | Olson | Jan. 2, 1951 |
| 2,581,134 | Odell | Jan. 1, 1952 |
| 2,606,104 | Hogan et al. | Aug. 5, 1952 |
| 2,613,173 | Kaasa | Oct. 7, 1952 |